(12) United States Patent
Ralph (10) Patent No.: US 10,364,623 B2
(45) Date of Patent: Jul. 30, 2019

(54) EXTENDED SHALE SHAKER SCREEN HANDLE(S)

(71) Applicant: UNITED WIRE, LTD., Aberdeenshire (GB)

(72) Inventor: Andrew Ralph, Edinburgh (GB)

(73) Assignee: United Wire Limited, Aberdeen (GB)

( * ) Notice: Subject to any disclaimer, the term of this patent is extended or adjusted under 35 U.S.C. 154(b) by 474 days.

(21) Appl. No.: 14/650,567

(22) PCT Filed: Dec. 9, 2013

(86) PCT No.: PCT/US2013/073954
§ 371 (c)(1),
(2) Date: Jun. 8, 2015

(87) PCT Pub. No.: WO2014/089577
PCT Pub. Date: Jun. 12, 2014

(65) Prior Publication Data
US 2015/0315862 A1 Nov. 5, 2015

Related U.S. Application Data

(60) Provisional application No. 61/734,968, filed on Dec. 8, 2012.

(51) Int. Cl.
*B01D 33/80* (2006.01)
*B01D 33/03* (2006.01)
(Continued)

(52) U.S. Cl.
CPC ........ *E21B 21/065* (2013.01); *B01D 33/0346* (2013.01); *B01D 33/80* (2013.01);
(Continued)

(58) Field of Classification Search
CPC .... B07B 1/00; B07B 1/02; B07B 1/04; B07B 1/30; B07B 1/34; B07B 1/46; B07B 1/49;
(Continued)

(56) References Cited

U.S. PATENT DOCUMENTS 296,447 A * 4/1884 Pigueron ............... F24B 15/007
209/417
4,820,407 A * 4/1989 Lilie ..................... B01D 29/05
209/397

(Continued)

FOREIGN PATENT DOCUMENTS

GB 268226 A * 3/1927 ............... B07B 1/30

OTHER PUBLICATIONS

International Search Report and Written Opinion for the equivalent International patent application PCT/US2013/73954 dated Apr. 18, 2014.

(Continued)

*Primary Examiner* — David C Mellon
(74) *Attorney, Agent, or Firm* — Jeffrey D. Frantz (57) ABSTRACT

This disclosure is generally drawn to systems, devices, apparatus, and/or methods related to shaker/filtration systems for drilling environments. Specifically, the disclosed systems, devices, apparatus, and/or methods relate to extended handles on screens used in shaker/filtration systems for drilling environments. In some examples, extended screen handle(s) may include a fastening portion and a handling portion. The fastening portion may be adapted to be coupled to a screen along a side of the screen, and the handling portion may be coupled to the fastening portion. The handling portion may extend above the screen and extend about 25-100% of the length of the side of the screen.

14 Claims, 7 Drawing Sheets

(51) Int. Cl.
| | |
|---|---|
| B07B 1/46 | (2006.01) |
| B01D 35/28 | (2006.01) |
| E21B 21/06 | (2006.01) |
| F25B 1/10 | (2006.01) |
| F25B 31/00 | (2006.01) |
| F04D 17/12 | (2006.01) |
| F04D 25/06 | (2006.01) |
| F04D 29/42 | (2006.01) |
| F04D 29/58 | (2006.01) |
| F25B 1/053 | (2006.01) |
| F04D 29/059 | (2006.01) |

(52) U.S. Cl.
CPC ............... *B01D 35/28* (2013.01); *B07B 1/46* (2013.01); *F04D 17/122* (2013.01); *F04D 25/0606* (2013.01); *F04D 29/4206* (2013.01); *F04D 29/5806* (2013.01); *F25B 1/053* (2013.01); *F25B 1/10* (2013.01); *F25B 31/008* (2013.01); *B01D 2201/24* (2013.01); *F04D 29/059* (2013.01); *F25B 2400/13* (2013.01)

(58) Field of Classification Search
CPC ............ B07B 2201/00; B07B 2201/02; B01D 2201/24; B01D 46/4227; B01D 35/28; B01D 33/01; B01D 33/015; B01D 33/0158; B01D 33/0166; B01D 33/0183; B01D 33/03; B01D 33/0346; B01D 33/0353; B01D 33/0361; B01D 33/0376; B01D 33/80; E21B 21/065; F25B 1/053; F25B 31/008; F25B 1/10; F25B 2400/13; F04D 29/5806; F04D 25/0606; F04D 17/122; F04D 29/4206; F04D 29/059; B25G 3/00; B25G 3/36; B25G 1/00; B25G 1/10; B25G 1/102; A01B 1/22

USPC ........................................................ 209/417
See application file for complete search history.

(56) References Cited

U.S. PATENT DOCUMENTS

| | | | | |
|---|---|---|---|---|
| 5,335,784 | A * | 8/1994 | Tyler | B07B 1/005 209/260 |
| 7,918,346 | B2 * | 4/2011 | Roppo | B07B 1/485 209/405 |
| 8,944,253 | B2 * | 2/2015 | Ward | B03C 7/006 209/417 |
| 2004/0007508 | A1 * | 1/2004 | Schulte, Jr. | B01D 29/012 209/403 |
| 2007/0007181 | A1 * | 1/2007 | Barrett | B07B 1/46 209/385 |
| 2008/0029442 | A1 * | 2/2008 | Schulte, Jr. | B01D 29/012 209/333 |
| 2008/0105598 | A1 | 5/2008 | Fisher et al. | |
| 2010/0299852 | A1 * | 12/2010 | Fayyad | E04H 4/1654 15/1.7 |
| 2011/0240531 | A1 | 10/2011 | Timmerman et al. | |
| 2013/0313168 | A1 * | 11/2013 | Wojciechowski | B07B 1/00 209/275 |

OTHER PUBLICATIONS

International Preliminary Report on Patentability for the equivalent International patent application PCT/US2013/73954 dated Jun. 9, 2015.

* cited by examiner

EXTENDED SHALE SHAKER SCREEN HANDLE(S)

BACKGROUND

Many applications require that fluids be screened to remove solids (such as foreign objects, rocks, and particulates). Some examples include water treatment applications, hazardous material handling applications, and drilling applications. For example, in oilfield environments, fluid used in oilfield activities must be filtered via a screening process. The present disclosure contemplates that oil drilling operations typically include shakers to separate contaminants and/or undesirable objects from drilling fluid (or mud).

The present disclosure further contemplates that one mechanism for separating the contaminants and/or undesirable objects from drilling fluid are screens held in place by the screen bed of the shaker basket. The screens may filter contaminants and/or undesirable objects from the drilling fluid as the shaker basket vibrates. The screens used in the shaker typically have handles used to insert the screens into the screen bed of the shaker basket. Conventional screen handles extend along only a small portion of the edge of the screen. As mishandling of screens during storage and installation is a major cause of screen failure, improvement in handleability of the screens may be desirable. Additionally, as improper installation is another major cause of screen failure, simplified and easier installation of the screens may also be desirable.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described herein are not meant to be limiting. Other embodiments may be utilized, and other changes may be made, without departing from the spirit or scope of the subject matter presented here. II will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems, devices, apparatus, and/or methods related to shaker/filtration systems for drilling environments. Specifically, the disclosed systems, devices, apparatus, and/or methods relate to extended handles on screens used in shaker/filtration systems for drilling environments.

Figure 1:
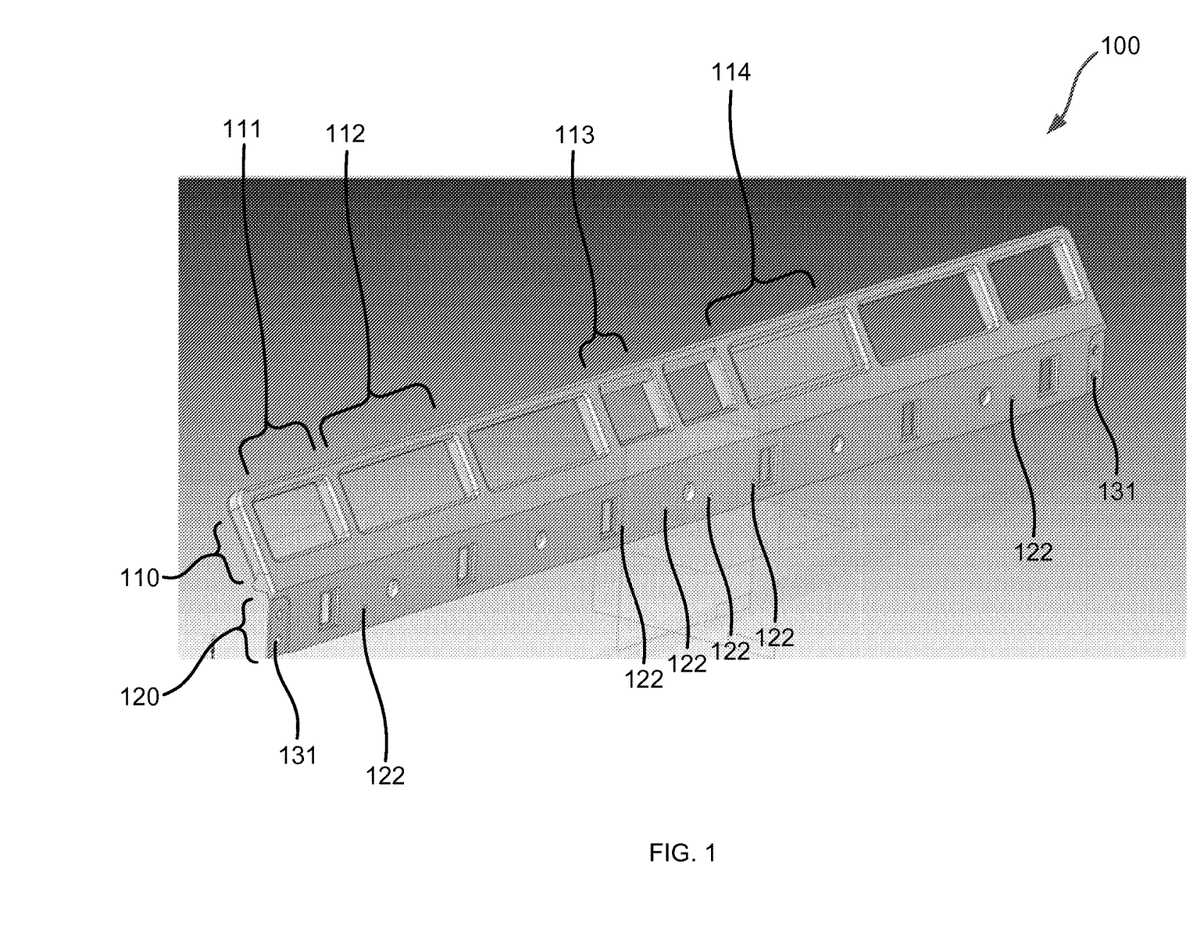
FIG. 1 depicts a side perspective view of an example extended screen handle.

FIG. 1 depicts a side perspective view of an example extended screen handle 100. The extended screen handle 100 may include a handling portion 110 and a fastening portion 120. The handling portion 110 may extend the length of the fastening portion 120. The handling portion 110 and the fastening portion 120 may be coupled at an angle such that the fastening portion 120 may be parallel to the side of the screen to which the extended screen handle 100 is affixed, and the handling portion 110 may be angled away from the screen basket wall at an angle (e.g., acute, obtuse) with the top of the screen.

The handling portion 110 may extend from about 25-100% of the length of the screen's side. In some examples, the handling portion 110 may extend from about 50-75% of the length of the screen's side. In some examples, the handling portion 110 may extend from about 75-100% of the length of the screen's side. In some examples, such as depicted in FIG. 1, the handling portion 110 may extend the entire (i.e., 100%) length of the screen's side.

The handling portion 110 may include a series of grips 111, 112, 113, 114 that may allow the operator to easily maneuver the screen on to, within, and/or off of the shaker basket. The grips 111, 112, 113, 114 of the handling portion 110 may be various widths and heights and may include any numbers of partitions forming the grips 111, 112, 113, 114. In some examples, the substantial entirety of the handling portion 110 may consist of grips. In some examples, only a portion of the handling portion 110 may consist of grips.

The fastening portion 120 may include a series of fastening holes 122 that may allow the extended screen handle 100 to be affixed to the screen. In some examples, the fastening portion may be permanently affixed to the screen via the fastening holes 122, while, in other examples, the fastening portion may be detachably affixed to the screen via the fastening 122. The fastening holes 122 may be arranged in various configurations and/or shapes to accommodate the size, dimensions, and/or structure of the screen to which the extended screen handle 100 may be affixed. Locking holes 131 may be arranged in the fastening portion 120 to form a seal with the screen.

In some examples, the extended screen handle 100 may be manufactured via an injection molding process. In some examples, extended screen handle 100 may include an over-molded seal. An over-molded seal may provide a seal between the screen and the shaker basket wall to reduce and/or prevent drilling fluid loss.

Extended screen handles 100 may provide easier installation and reduced potential for damaging the screen during handling. For example, the extended screen handle 100 may make it easier for one operator to install screens, whereas conventional screens typically require two operators for screen installation. Additionally, the extended screen handles 100 may be installed from the end of the shaker.

During handling, the extended screen handles 100 may prevent one screen from falling onto another screen and damaging the screen's wirecloth, The extended screen handle 100 may act as a rail such that an operator may slide the screen affixed to the extended screen handle 100 across the surface of the shaker pit during installation of the screen onto the shaker pit. Similarly, the extended screen handle 100 may act as a rail such that an operator may slide the screen affixed to the extended screen handle 100 across the surface of the shaker pit during removal of the screen from the shaker pit. In this manner, the screen suffixed to the extended screen handle 100 may be installed and/or removed from an end of the shaker pit by one operator.

In some examples, the extended screen handle 100 may act as a rail such that an operator may slide the screen affixed to the extended screen handle 100 across a top surface of a handle of another screen installed in the shaker pit during installation of the screen onto the shaker pit. Similarly, in some examples, the extended screen handle 100 may act as a rail such that an operator may slide the screen affixed to the extended screen handle 100 across a top surface of a handle of another screen installed in the shaker pit during removal of the screen from the shaker pit. In this manner, the screen suffixed to the extended screen handle 100 may be installed and/or removed from an end of the shaker pit by one operator.

Figure 2:
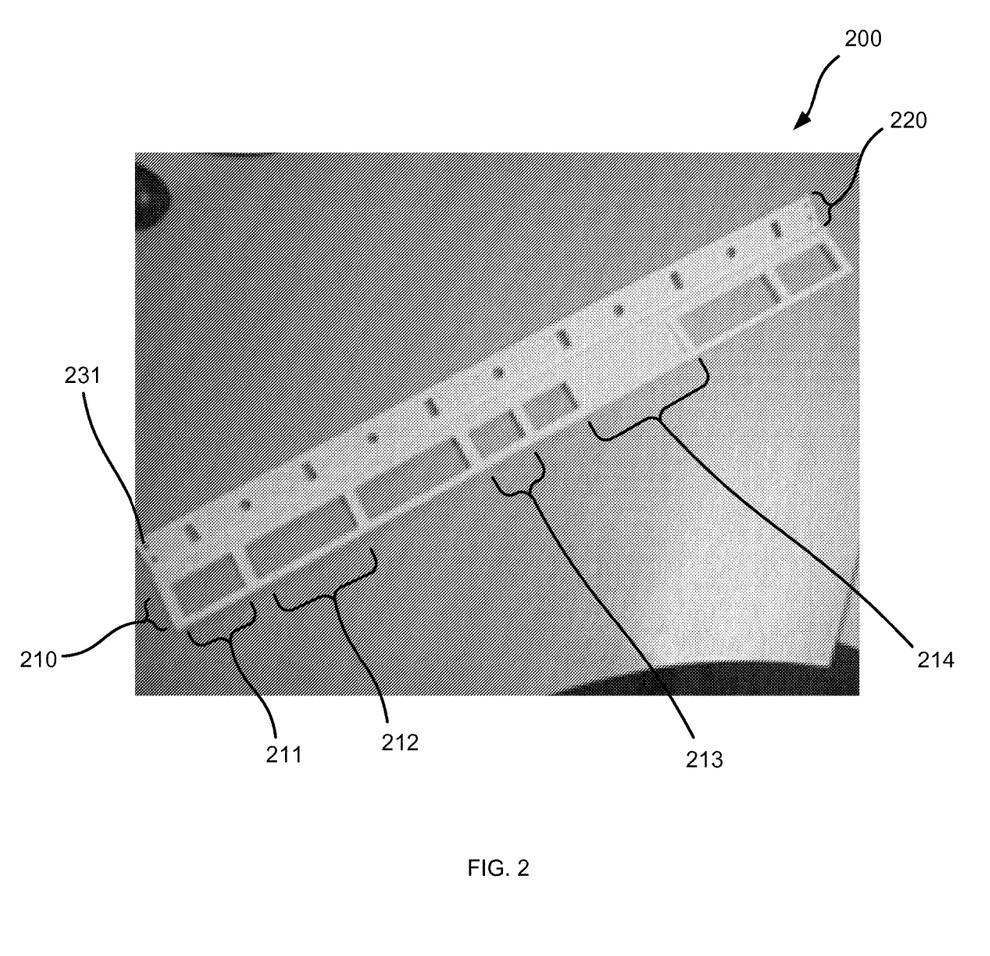
FIG. 2 depicts a top perspective view of another example extended screen handle.

Further, because the extended screen handle 100 may act as a rail to slide the screen across a top surface of another screen, contact between the surfaces of both screens may be reduced. In this manner, damage to one or both screens may be reduced, FIG. 2 depicts a top perspective view of an example extended screen handle 200. The extended screen handle 200 may include a fastening portion 220 with locking holes 231, a handling portion 210, and grip(s) 211, 212, 213, 214.

Figure 3:
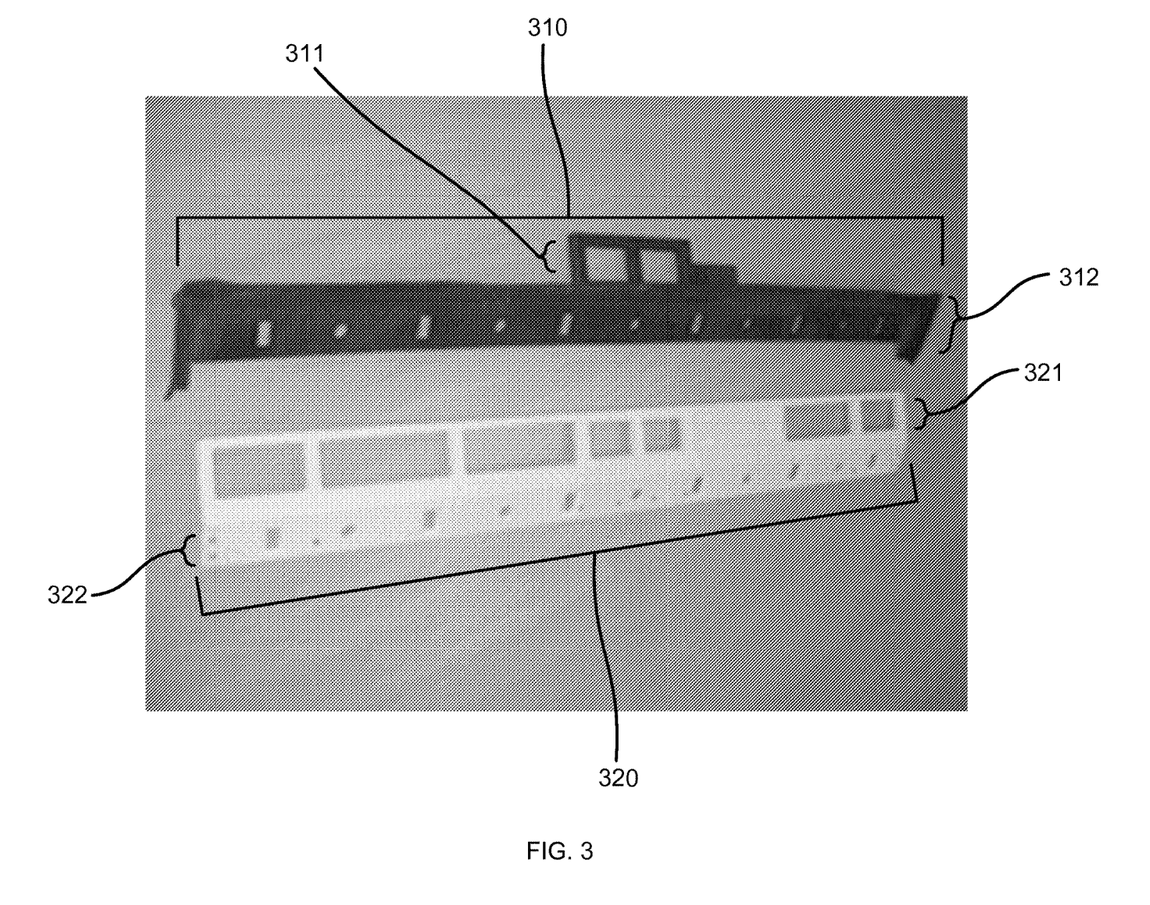
FIG. 3 depicts a top perspective view of yet another example extended screen handle next to an example conventional screen handle.

FIG. 3 depicts a top perspective view of an example extended screen handle 320 next to an example of a conventional screen handle 310. The conventional screen handle 310 includes a handling portion 311 that extends only a small portion of the length of the fastening portion 312, On the extended screen handle 320, however, the handling portion 321 may extend from 25-100% of the length of the fastening portion 322 and/or of the length of the screen's side.

Figure 4:
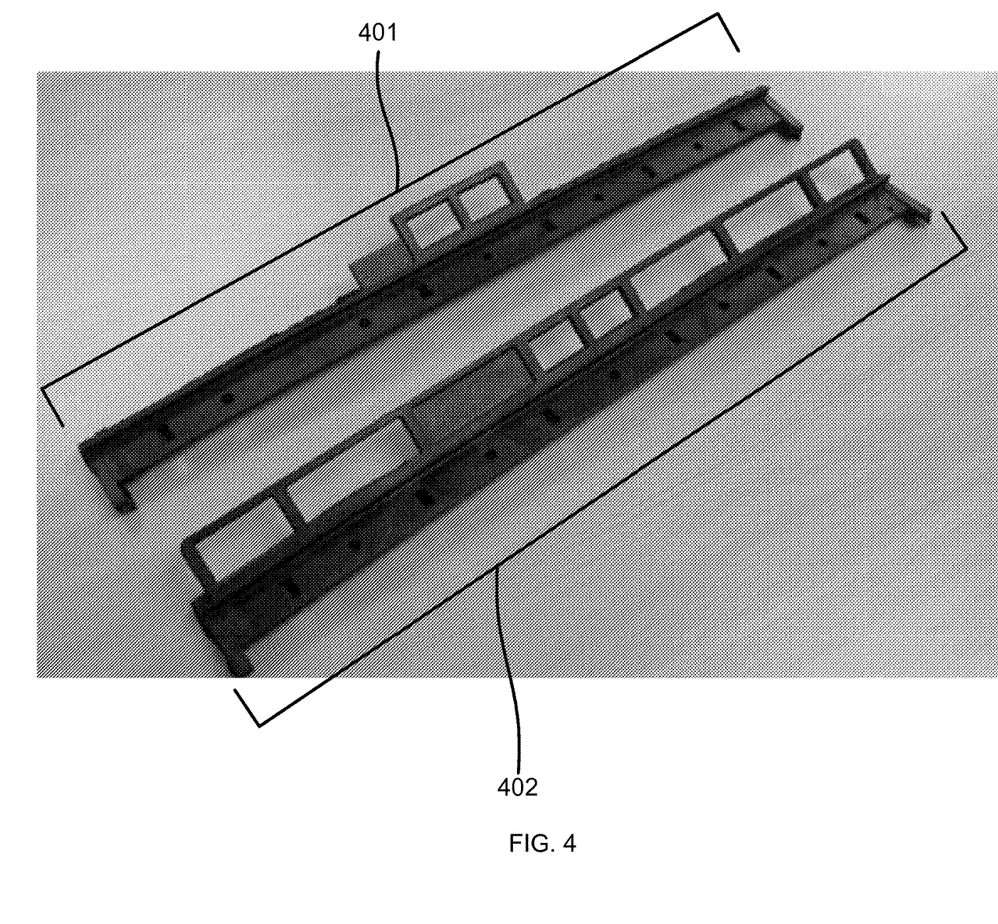
FIG. 4 depicts a side perspective view of an example extended screen handle next to a conventional screen handle.
Figure 5:
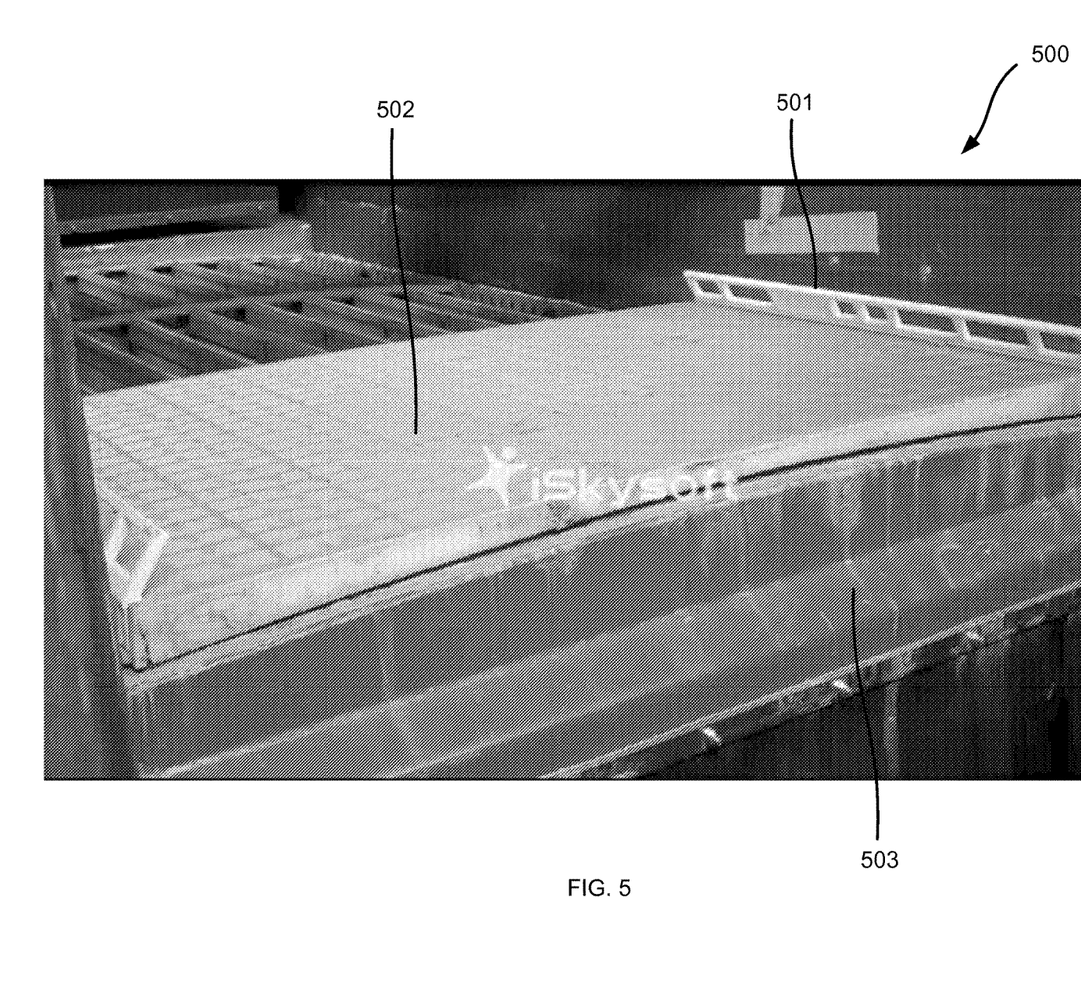
FIG. 5 depicts a side perspective view of an example screen inserted into a shaker.

FIG. 4 depicts another side perspective view of an example extended screen handle 402 next to an example of a conventional screen handle 401, FIG. 5 depicts a side perspective view of a shaker system 500 where a screen 502 having example extended screen handles 501 is inserted and/or installed into the shaker basket 503. The extended screen handle 501 may be affixed to the side of screen 502 and may extend above the top of the screen 502. The screen 502 may be placed in the shaker basket 503 by an operator gripping the extended screen handle 501. Further, the screen 502 may be moved within the shaker basket 503 by the operator gripping the extended screen handle 501. Further, the screen 502 may be removed from the shaker basket 503 by the operator gripping the extended screen handle 501.

Figure 6:
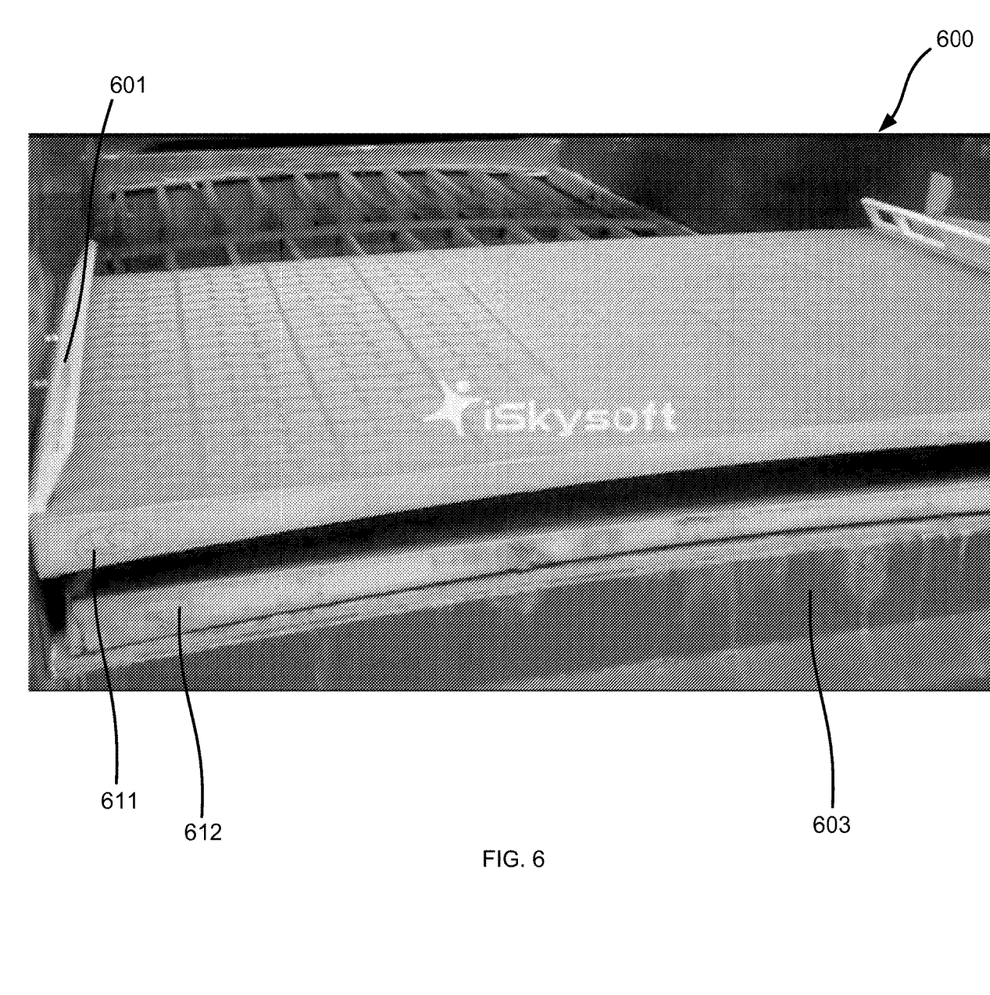
FIG. 6 depicts a side perspective view of stacked screens inserted into the shaker of FIG. 5.

FIG. 6 depicts a side perspective view of a shaker system 600 wherein screens 611, 612 may be stacked on each other and/ may slide over top of each other during installation, removal, and/or manipulation of the screens 611, 612 into, from, and/or within a shaker basket 603. The extended screen handles 601 may allow the screens 611, 612 to slide over each other or rest upon each other without the screens 611, 612 coming into contact. The bottom surface of the screen 611 may slide along the top of the extended screen handle (not visible) affixed to the screen 612. Because the extended screen handles extend the entire length of the screens 611, 612 closest to the shaker basket wall, the screen 611 may slide all the way across the extended screen handle affixed to the screen 612 without the body of the screens 611, 612 coming into contact. In this manner, possible damage to the body of the screens 611, 612 may be reduced and/or avoided.

Figure 7:
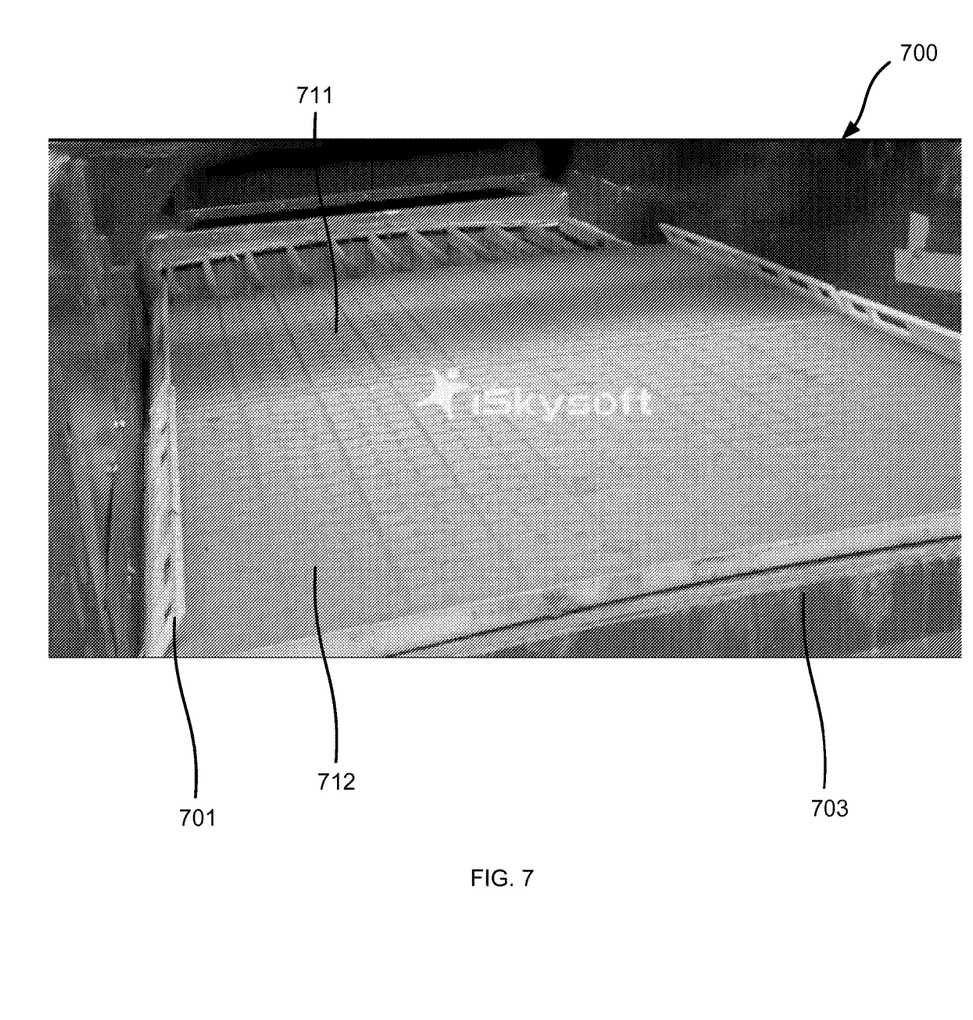
FIG. 7 depicts another side perspective view of the example screens inserted into the shaker of FIG. 5-6; all arranged in accordance with at least some of the embodiments disclosed in the present disclosure.

FIG. 7 depicts another side perspective view of a shaker system 700 wherein the screens 711 and 712 are inserted and/or installed into the shaker basket 703, and the screens 711, 712 have extended screen handles 701.

In some examples, shaker pit systems may include any number of screens. For example, some shaker pit systems may include two screens while other shaker pit systems may include four screens.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A system, comprising:
   a fastening portion having a total length defined between a first end and an opposite second end, a total width defined between a front surface and an opposite rear surface, and a total height defined between a bottom surface and an opposite top surface, wherein the total length is greater than the total width and the total height, the total width is less than the total length and the total height, and a cross-sectional shape of the fastening portion is rectangular;
   a handling portion coupled to the opposite top surface of the fastening portion and comprising a plurality of grips adapted for handling by an operator, wherein the handling portion extends away from the opposite top surface of the fastening portion at an obtuse angle from a vertical plane defined by the total width of the fastening portion; and
   a screen coupled to the fastening portion such that the plurality of grips of the handle portion is positioned directly above a top or a top surface of the screen and vertically overlaps a portion of the top or the surface of the screen and extends along a majority portion, at least 50%, of the total length of the fastening portion.

2. An apparatus, comprising:
   a fastening portion adapted to be coupled to a screen along at least one exterior surface of the screen, wherein the fastening portion has a total length defined between a first end and an opposite second end, a total width defined between a front surface and an opposite rear surface, and a total height defined between a bottom surface and an opposite top surface, wherein the total length is greater than the total width and the total height, the total width is less than the total length and the total height and the total width is constant along the total height from the bottom surface to the opposite top surface for at least a portion of the total length between the first end and the opposite second end, wherein the total width of the fastening portion defines a vertical plane of the fastening portion; and
   a handling portion coupled to the opposite top surface of the fastening portion, wherein the handling portion extends away from the opposite top surface of the fastening portion at an obtuse angle with respect to the vertical plane defined by the total width of the fastening portion such that, when the fastening portion is coupled to the screen, the handle portion is positioned directly above a top or a top surface of the screen and extends about 25-100% of the total length of the fastening portion, and further wherein the total length of the fastening portion extends along an entire length of the at least one exterior surface of the screen.

3. The apparatus of claim 2, wherein, when the fastening portion is coupled to the screen, the handling portion extends about 25-50% of the total length of the fastening portion.

4. The apparatus of claim 2, wherein, when the fastening portion is coupled to the screen, the handling portion extends about 50-75% of the total length of the fastening portion.

5. The apparatus of claim 2, wherein, when the fastening portion is coupled to the screen, the handling portion extends about 75-100% of the total length of the fastening portion.

6. The apparatus of claim 2, wherein, when the fastening portion is coupled to the screen, the at least one exterior surface of the screen comprises one entire side of the screen.

7. The apparatus of claim 6, wherein the handling portion and the fastening portion are each injection molded.

8. The apparatus of claim 2, wherein, when the fastening portion is coupled to the screen, the fastening portion is temporarily coupled to the screen.

9. The apparatus of claim 2, wherein the handling portion comprises a plurality of grips adapted for handling by an operator.

10. The apparatus of claim 2, wherein the fastening portion comprises a plurality of fastening holes adapted to couple the fastening portion to the screen.

11. A method, comprising:
coupling the fastening portion of the apparatus, according to claim 2, to at least one exterior side of a first screen to provide at least one handle of the first screen such that an end of the handle portion located opposite the fastening portion is positioned above a top of the first screen and vertically overlaps a portion of the top of the first screen;
positioning the first screen into a shaker basket via the at least one handle of the first screen that extend about 25-100% of the entire length of the at least one exterior side of the first screen.

12. The method of claim 11, further comprising:
positioning a second screen into a shaker basket via one or more second handles that extend about 25-100% of a length of at least one side of the second screen.

13. The method of claim 12, further comprising:
sliding the second screen along the at least one handle of the first screen until the second screen rests on the shaker basket.

14. The method of claim 12, further comprising:
sliding the second screen along the at least one handle of the first screen until the second screen is removed from the shaker basket.

\* \* \* \* \*